US011115510B1

United States Patent
Abdul-Gaffoor et al.

(10) Patent No.: US 11,115,510 B1
(45) Date of Patent: Sep. 7, 2021

(54) COMMUNICATION DEVICE HAVING ANTENNA ARRAYS CONFIGURED BASED ON OPEN/CLOSED POSITION OF HOUSING

(71) Applicant: MOTOROLA MOBILITY LLC, Chicago, IL (US)

(72) Inventors: Mohammed R. Abdul-Gaffoor, Palatine, IL (US); Eric L. Krenz, Crystal Lake, IL (US); Md Rashidul Islam, Lombard, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/906,860

(22) Filed: Jun. 19, 2020

(51) Int. Cl.
*H04M 1/02* (2006.01)

(52) U.S. Cl.
CPC ....... *H04M 1/0245* (2013.01); *H04M 1/0216* (2013.01)

(58) Field of Classification Search
CPC .......................... H04M 1/0245; H04M 1/0216
See application file for complete search history.

(56) References Cited

U.S. PATENT DOCUMENTS

| | | | |
|---|---|---|---|
| 7,026,989 B1 * | 4/2006 | Minkoff | H01Q 3/36 342/372 |
| 2020/0194904 A1 * | 6/2020 | Huh | H01Q 21/065 |

OTHER PUBLICATIONS

Christodoulou, C.G. et al., "Design of a Foldable Low-Loss Microstrip Array Antenna", IEEE, pp. 2732-2735, 1999.
Duan, Ran, et al., "Foldable Aperture Coupled Microstrip Antenna Array for Portable Wireless Application", IEEE, pp. 471-474, 2008.
Georgakopoulos, Stavros V., "Reconfigurable Origami Antennas", ACES, 2019.
Biswas, Akash, et al., "Radar Cross Section Reduction of a Foldable Microstrip Patch Array", IEEE, pp. 1695-1696, 2019.
Shah, Syed Imran Hussain, et al. Transformation from a Single Antenna to a Series Array Using Push/Pull Origami, MDPI.com, Sensors, Aug. 2017.

* cited by examiner

*Primary Examiner* — Ankur Jain
*Assistant Examiner* — Angelica M Perez
(74) *Attorney, Agent, or Firm* — Isidore PLLC (57) ABSTRACT

A communication device, computer program product, and method enable associating a closed position and an open position of a movable housing positionably coupled to a base housing of the communication device with alternate ones of first and second modes of antenna communication that respectively utilize an antenna array of a first sub-array aligned or not aligned in a second sub-array. The first array of first antenna(s) is housed within the base housing. The second sub-array of second antenna(s) is housed within the movable housing. The controller monitors a housing sensor positioned to detect the closed position and the open position. In response to identifying the mode, the controller configures a modem to use an excitation matrix associated with the mode comprising magnitude and phase settings to apply to each antenna of the first and the second sub-arrays to act either independently or as an array.

17 Claims, 6 Drawing Sheets

COMMUNICATION DEVICE HAVING ANTENNA ARRAYS CONFIGURED BASED ON OPEN/CLOSED POSITION OF HOUSING

1. TECHNICAL FIELD

The present disclosure relates generally to communication devices having antenna arrays, and more particularly to communication devices having antenna arrays housed within a housing that opens and closes.

2. DESCRIPTION OF THE RELATED ART

Communication devices, such as smartphones, incorporate a number of antennas to support multiple frequency bands assigned to various types of communication networks. Recent designs of communication devices also incorporate an increasing number of antennas for spatial diversity and directional antenna gain via multiple-in multiple output (MIMO) operations. The communications devices are also often designed with displays that tend to dominate or fully cover at least a front side of the communication device, reducing an available surface area for antennas. Smartphones having a "flip phone" form factor further reduce available surface area by having surfaces that are hidden when the communication device is folded or closed. Some designs of flip phones have a second display on a backside of the phone that is visible when the communication device is folded or closed, further reducing available locations for antennas. Recent flip phone designs include flexible displays on a front side that folds when the communication device closes. This design enables the large uninterrupted display of an alternative "candy bar" form factor but with the ability to stow the flip phone in a smaller closed state.

Recent developments and standards for communication devices include use of higher communication bands that can support higher data rates. For example, the latest cellular service standard referred to as fifth generation new radio (5G NR) uses spectrum in the existing fourth generation long term evolved (4G LTE) standard in sub-6 GHz frequency range (600 MHz to 6 GHz). For higher data rates, 5G NR also uses spectrum in millimeter wave (mmWave) bands (24-86 GHz). The mmWave band assigned to 5G NR has short wavelengths of 1-10 mm that require placement of the antenna at or near the surface of the communication device for satisfactory antenna performance. At these frequencies, the individual antennas can be small and directional. Achieving sufficient transmit power and coverage requires use of a group of antennas positioned as a sub-array or an array of mmWave antennas to operate together for antenna beam steering. Other sub-arrays or arrays of mmWave antennas are placed on more than one side of the communication device for spatial coverage. Achieving required antenna beam steering or spatial coverage can be compromised by mmWave antennas affected by an open position or closed position of the communication device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to aspects of the present disclosure, a communication device, computer program product, and method enable configuring and reconfiguring of antenna sub-arrays in response to opening and closing of a housing of the communication device. The housing of the communication device includes a movable housing positionably coupled to a base housing. A controller associates a closed position and an open position of the movable housing with alternate ones of a first mode of antenna communication and a second mode of antenna communication. The first mode utilizes an antenna array that comprises a first sub-array aligned with a second sub-array. The second mode independently utilizes the first sub-array and the second sub-array, which are not aligned with each other. The first sub-array includes at least one first antenna and housed within the base housing. The second sub-array includes at least one second antenna and is housed within the movable housing. The controller monitors a housing sensor positioned to detect the closed position and the open position. In response to identifying the open/closed position that is associated with the first mode, the controller configures a modem to use a first excitation matrix. The first excitation matrix includes magnitude and phase settings to apply respectively to each antenna of the first and the second sub-arrays to steer antenna beam of the antenna array. In response to identifying the open/closed position that is associated with the second mode, the controller configures the modem to use at least one second excitation matrix that sets magnitude and phase of respective antennas of the first and the second sub-arrays to operate independently.

According to one or more embodiments, the antenna sub-arrays include mmWave antennas that are positioned to operate in different modes to maximize equivalent isotopically radiated power (EIRP) and cumulative distribution function (CDF). EIRP is the hypothetical power that would have to be radiated by an isotropic antenna to give the same ("equivalent") signal strength as the actual source antenna in the direction of the antenna's strongest beam. The difference between EIRP and equivalent radiated power (ERP) is that ERP compares the actual antenna to a half-wave dipole antenna, while EIRP compares the actual antenna to a theoretical isotropic antenna. Maximized EIRP and CDF support increased data rates of advanced radio access technologies for mobile cellular data service. Placement of antenna sub-arrays can be paired so that antenna arrays can be formed in one of the closed and open positions for providing additional antenna steering and gain to achieve these data rates in one mode. Placement of antenna sub-arrays can also provide additional coverage in one of the open and closed positions with paired antenna sub-arrays operating independently in another mode.

In one or more embodiments, the movable housing and the base housing include an outer shell. First and second sub-arrays of mmWave antennas are packaged as a module having integral power management and a radio frequency integrated circuit (RFIC). The mmWave antenna modules are housed respectively within the base and the movable housings. The mmWave antenna modules are placed close to an outer shell of the housing of the communication device. In one or more embodiments, the outer shell is plastic or glass. A minimum separation distance from the mmWave antenna module to the plastic/glass surface is implemented that avoids frequency detuning/efficiency degradation. The mmWave antenna modules are connected to a main printed circuit board (PCB) by flexible PCBs.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Figure 1:
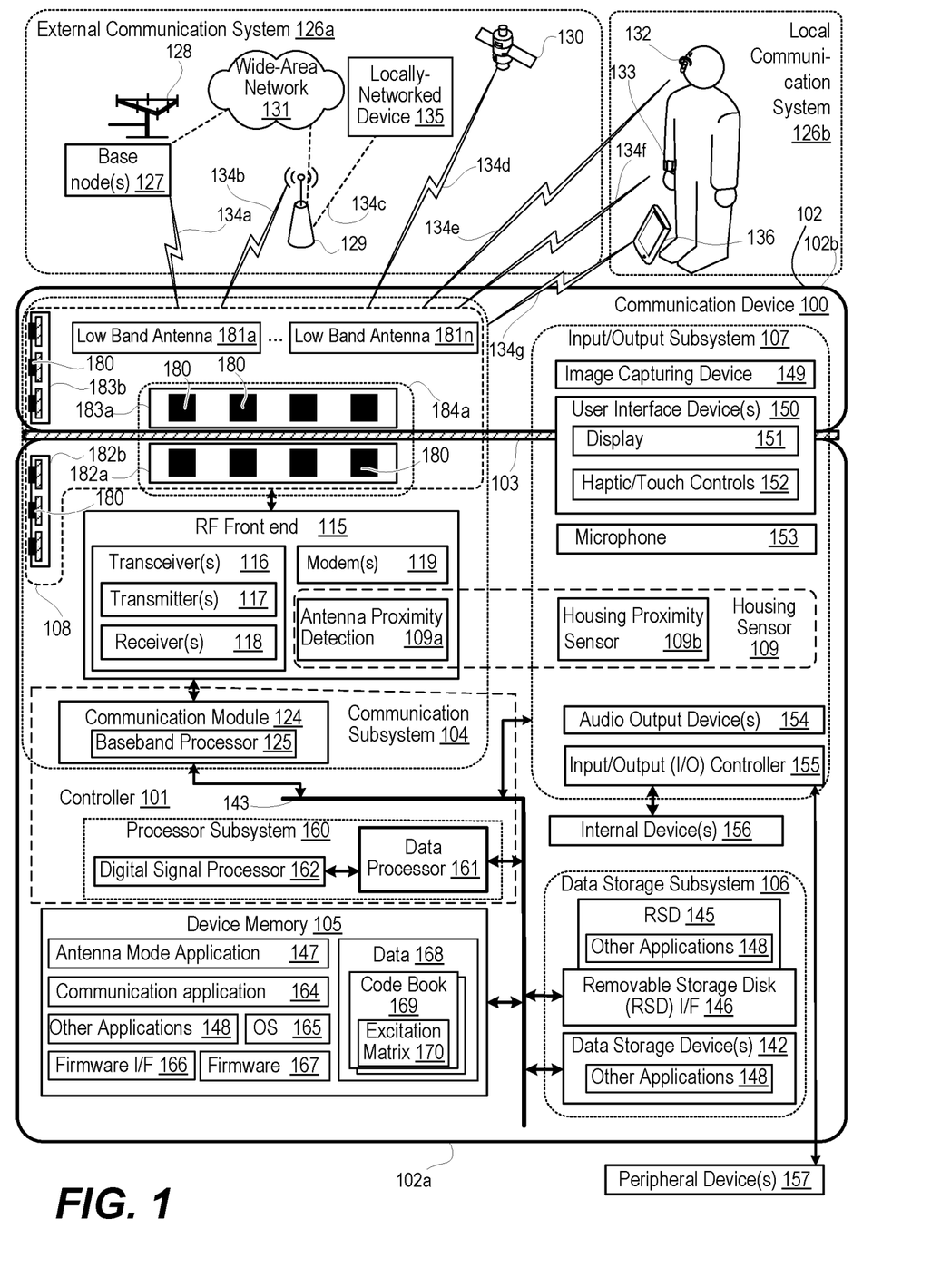
FIG. 1 is a functional block diagram of an electronic device that operates as a communication device in a communication environment and within which the features of the present disclosure are advantageously implemented, according to one or more embodiments.

FIG. 1 is a functional block diagram of an electronic device in an operating environment within which the features of the present disclosure are advantageously implemented. In particular, the electronic device is presented as communication device 100, which is managed by controller 101. According to one aspect, communication device 100 is a mobile or hand-held device having housing 102 with a flip phone form. Housing 102 includes base housing 102a and movable housing 102b that are coupled for movement by pivotable coupling mechanism 103. Housing 102 is positionable between an open position and a closed position. The closed position is also referred to as folded. While presented as communication device 100, it is appreciated that the features describe herein are fully applicable to other types of electronic devices, and that the presentation of communication device 100 is solely as an example and not meant to be limiting on the disclosure. Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In one or more embodiments, communication device 100 includes communication subsystem 104, device memory 105, data storage subsystem 106, and input/output (I/O) subsystem 107. Each subsystem (104, 106, and 107) is managed by controller 101. Communication subsystem 104 includes antenna subsystem 108. Controller 101 configures antenna subsystem 108 based on whether housing sensor 109 detects that housing 102 is in the open position or the closed position.

In one or more embodiments, housing sensor 109 is housing proximity sensor 109a that detects proximity of movable housing 102b to base housing 102a. In one or more embodiments, housing proximity sensor 109a has a mechanical extension that is depressed when the base and movable housings 102a-102b move in one of open and closed positions. The depression changes a switch position, indicating the open/closed position of the housing. In one or more embodiments, housing proximity sensor 109a includes an electromagnetic field producing component in one of the base and mobile housings 102a-102b and a target positioned in the other one of the base and mobile housing. The target has an electromagnetic impedance that is detected by the electromagnetic field producing component with a change in strength based on the open/position of housing 102.

In one or more embodiments, housing sensor 109 is antenna proximity sensor 109b that detects proximity of one particular portion of antenna subsystem 108 housed within one of base and movable housing 102a-102b to another particular portion of antenna subsystem 108 that is housed within an alternate one of base and movable housing 102a-102b. Antenna proximity sensor 109b detects transmissions from the one particular portion of antenna subsystem 108 that is received by the other particular portion of antenna subsystem 108. The strength of the detected transmissions indicates the relative position of movable housing 102b to base housing 102a. Communication subsystem 104 also includes RF front end 115 having transceiver(s) 116 that includes transmitter(s) 117 and receiver(s) 118. RF front end 115 further includes modem(s) 119. Communication subsystem 104 includes communication module 124 having baseband processor 125. Baseband processor 125 communicates with controller 101 and RF front end 115. Baseband processor 125 operates in baseband frequency range to encode data for transmission and decode received data, according to a communication protocol. Modem(s) 119 modulate baseband encoded data from communication module 124 onto a carrier signal to provide a transmit signal that is amplified by transmitter(s) 117. Modem(s) 119 demodulates each signal received from external communication system 126a detected by antenna subsystem 108. The received signal is amplified and filtered by receiver(s) 118, which demodulate received encoded data from a received carrier signal.

In one or more embodiments, controller 101, via communication subsystem 104, performs multiple types of over-the-air (OTA) or wireless communication with external communication system 126a. External communication system 126a can include devices such as base node(s) 127 elevated on respective radio tower(s) 128, access node(s) 129, and global positioning system (GPS) satellites 130. Some of these devices can be communicatively coupled to at least one wide area network 131. Communication subsystem 104 communicates via OTA communication channel(s) 134a with base node 127. Communication subsystem 104 communicates via wireless communication channel(s) 134b with access node 129. In one or more particular embodiments, access node 129 supports communication using one or more IEEE 802.11 wireless local area network (WLAN) protocols. Access node 129 is connected to wide area network 131, such as the Internet. In one or more particular embodiments, communication subsystem 104 communicates with one or more locally networked devices 135 via wired or wireless link 134c provided by access node 129. Communication subsystem 104 receives downlink broadcast channel(s) 134d from GPS satellites 130 to obtain geospatial location information.

In one or more embodiments, local communication system 126b includes wireless headset 132 and smart watch 133 that are coupled to communication device 100 to form a personal access network (PAN). Communication subsystem 104 communicates via low power wireless communication channel(s) 134e with headset 132. Communication subsystem 104 communicates via second low power wireless communication channel(s) 134f, such as Bluetooth, with smart watch 133. In one or more particular embodiments, communication subsystem 104 communicates with other communication device(s) 136 via wireless link 134g to form an ad hoc network.

Data storage subsystem 106 of communication device 100 includes data storage device(s) 142. Controller 101 is communicatively connected, via system interlink 143, to data storage device(s) 142. Data storage subsystem 106 provides nonvolatile storage that is accessible by controller 101. For example, data storage subsystem 106 can provide a selection of other application(s) 148 that can be loaded into device memory 105. In one or more embodiments, data storage device(s) 142 can include hard disk drives (HDDs), optical disk drives, and/or solid-state drives (SSDs), etc. Data storage subsystem 106 of communication device 100 can include removable storage device(s) (RSD(s)) 145, which is received in RSD interface 146. Controller 101 is communicatively connected to RSD 145, via system interlink 143 and RSD interface 146. In one or more embodiments, RSD 145 is a non-transitory computer program product or computer readable storage device. Controller 101 can access RSD 145 or data storage device(s) 142 to provision communication device 100 with program code, such as antenna mode application 147 and other applications 148. When executed by controller 101, the program code causes or configures communication device 100 to provide the functionality described herein.

I/O subsystem 107 includes image capturing device 149, housing proximity sensor 109a, and user interface device(s) 150 having one or more of displays 151 that present user interface (UI) 152, touch/haptic controls 152, microphone 153, and audio output device(s) 154. I/O subsystem 107 also includes I/O controller 155, which connects to internal devices 156 and peripheral devices 157 external to housing 102 of communication device 100.

Controller 101 includes processor subsystem 160, which includes one or more central processing units (CPUs), depicted as data processor 161. Processor subsystem 160 can include one or more digital signal processors 162 that are integrated with data processor 161 or are communicatively coupled to data processor 161, such as baseband processor 125. In one or embodiments that are not depicted, controller 101 can further include distributed processing and control components that are peripheral or remote to housing 102 or grouped with other components, such as I/O subsystem 107. Data processor 161 is communicatively coupled, via system interlink 143, to device memory 105. In one or more embodiments, controller 101 of communication device 100 is communicatively coupled via system interlink 143 to communication subsystem 104, data storage subsystem 106, and input/output subsystem 107. System interlink 143 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 143) are illustrated in FIG. 1, it is to be understood that more, fewer, or different interconnections may be present in other embodiments.

Controller 101 manages, and in some instances directly controls, the various functions and/or operations of communication device 100. These functions and/or operations include, but are not limited to including, application data processing, communication with other electronic devices, navigation tasks, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Device memory 105 includes applications such as antenna mode application 147, communication application 164, and other application(s) 148. Device memory 105 further includes operating system (OS) 165, firmware interface 166, such as basic input/output system (BIOS) or Uniform Extensible Firmware Interface (UEFI), and firmware 167. Device memory 105 includes data 168 used by antenna mode application 147, communication application 164, and other application(s) 148. In particular, data 168 includes code books 169 that include excitation matrices 170 for configuring antenna subsystem 108. Processor subsystem 160 of controller 101 executes program code to provide operating functionality of communication device 100. These software and/or firmware modules have varying functionality when their corresponding program code is executed by processor subsystem 160 or secondary processing devices within communication device 100. Processor subsystem 160 of controller 101 can execute program code of antenna mode application 147 to configure antenna subsystem 108 based on the detected position of housing 102.

According to aspects of the present disclosure, antenna subsystem 108 includes mmWave antennas 180, such as patch antennas. In addition, antenna subsystem 108 includes sub-6 GHz ("low band") antennas 181a-181n that support LTE communication and other lower frequency functions. First antenna sub-arrays 182a-182b, which each include one or more mmWave antennas 180, are housed within base housing 102a. Second antenna sub-arrays 183a-183b, which each include one or more mmWave antennas 180, are housed within movable housing 102b. First antenna sub-array 182a is paired with second antenna sub-array 183a to move in and out of array alignment with the opening and closing, respectively, of housing 102. First antenna sub-array 182b is paired with second antenna sub-array 183b to move in and out of array alignment with the closing and opening, respectively, of housing 102. In one or more embodiments, each of first and second antenna sub-arrays 182a-182b and 183a-183b are antenna array modules, such as a 1×4 arrangement of mmWave antennas 180. First antenna sub-array 182a is housed within a backside of base housing 102a and aligned and proximate to pivotable coupling mechanism 103. Second antenna sub-array 183a is housed within to a backside of movable housing 102b and aligned and proximate to pivotable coupling mechanism 103. The location of first and second antenna sub-arrays 182a, 183a are illustrative of using available locations on housing 102. Certain locations may be advantageous for coverage in a certain direction from housing 102 and for being positioned away from portions of housing 102 that are held or placed close to an ear of a user. First and second antenna sub-arrays 182a, 183a collectively form first antenna array 184a when housing 102 is in the open position. Controller 101 manages first antenna array 184a in a first mode. In a particular embodiment, controller 101 executes antenna mode application 147 that configures modem(s) 119 with excitation matrix 170 having magnitudes and phases that are applied to each mmWave antenna 180 of the first and second antenna sub-arrays 182a, 183a to operate as first antenna array 184a in mode 1. Modes of first and second antenna sub-arrays 182a, 183a are illustrated in more detail in FIGS. 2A-2D.

Figure 2A:
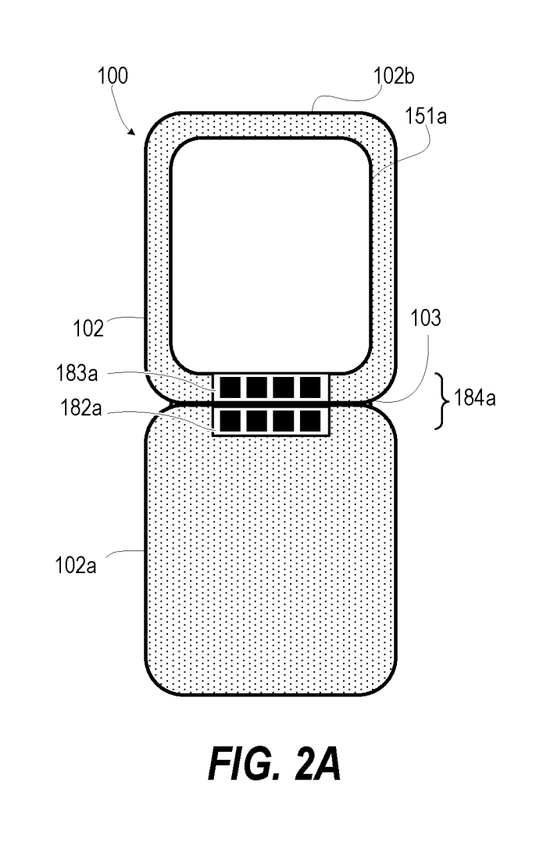
FIG. 2A depicts a back view of a three-dimensional structural example of the communication device of FIG. 1 with a housing having a flip phone form factor in an open position and an antenna subsystem in a first mode, according to one or more embodiments.

FIG. 2A depicts a back view of example communication device 100 with base housing 102a and movable housing 102b of housing 102 in the open position. Movable housing 102b includes back display 151a that constrains placement of second antenna sub-array 183a. Second antenna sub-array 183a is located between back display 151a and pivotal coupling mechanism 103. First and second antenna sub-arrays 182a, 183a are aligned in first antenna array 184 with housing 102 in the open position.

Figure 2B:
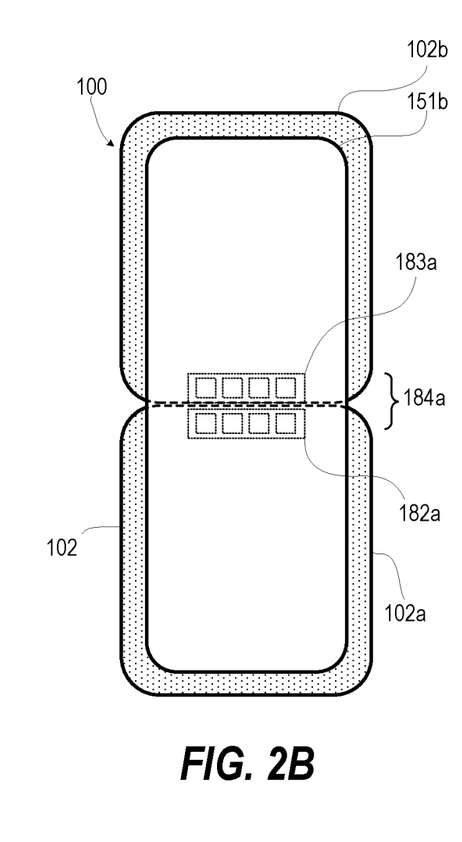
FIG. 2B depicts a front view of the example communication device of FIG. 2A with the housing in the open position, according to one or more embodiments.

FIG. 2B depicts a front view of example communication device 100 with base housing 102a and movable housing 102b of housing 102 in the open position. Movable housing 102b includes front display 151b that extends across base housing 102a, pivotal coupling mechanism 103, and movable housing 102b. First antenna array 184a (illustrated in phantom lines) is directed away from front display 151b, and a user that is viewing front display 151b.

Figure 2C:
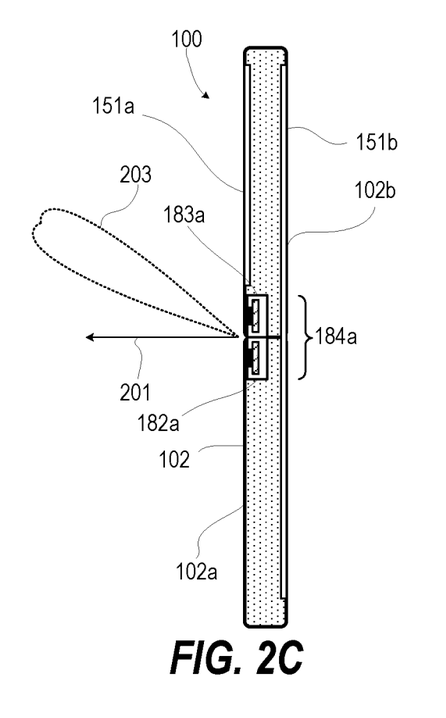
FIG. 2C depicts a side view of the example communication device of FIG. 2A with the housing in the open position, according to one or more embodiments.

FIG. 2C depicts a side view of example communication device 100 with base housing 102a and movable housing 102b of housing 102 in the open position. Both first and second antenna sub-arrays 182a, 183a are aligned to form first antenna array 184a. First and second antenna sub-arrays 182a, 183a are physically aligned with axis 201 perpendicular to back side of example communication device 100 in the open position. Resulting first antenna array 184a can cooperatively combine transmissions from first and second antenna sub-arrays 182a, 183a to achieve beam steering and antenna gain (beam narrowing) of radiated transmit signal 203a.

Figure 2D:
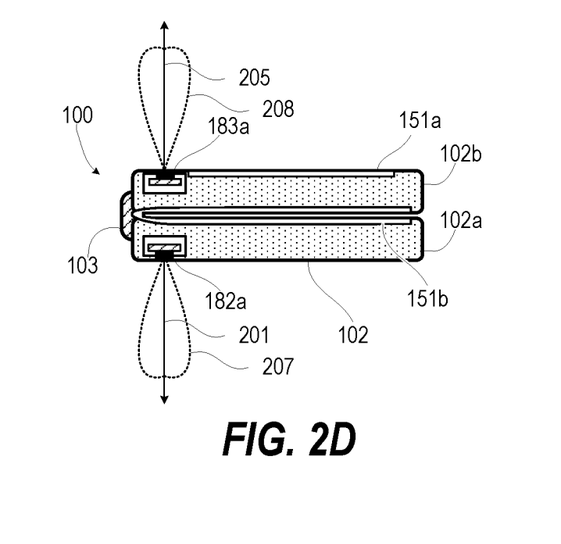
FIG. 2D depicts a side view of the example communication device of FIG. 2A with the housing in a closed position and the antenna subsystem in a second mode, according to one or more embodiments.

FIG. 2D depicts a side view of example communication device 100 with base housing 102a and movable housing 102b of housing 102 in the closed position. When closed, back display 151a and second antenna sub-array 182a on the back side of mobile housing 102b are rotated 180° relative to the open position (FIG. 2C). Second antenna sub-array 182a is directed along axis 205 that is opposite to axis 201. Radiated transmissions from first and second antenna sub-arrays 182a, 183a operate independently in the second mode with housing 102 in the closed position. Transmissions by first and second antenna sub-arrays 182a, 183a are not coordinated for beam steering or antenna gain. Respective radiated transmit signals 207-208 are not aligned for coordinated transmissions. The independent operation can provide additional coverage area with respective transmit signals 207-208 being directed in opposite directions.

Referring again to FIG. 1, first antenna sub-array 182b is housed within to a left side of base housing 102a as depicted. Second antenna sub-array 183b is housed within to a left side of movable housing 102b. As described below for FIGS. 3C-3E, first and second antenna sub-arrays 182b, 183b form second antenna array 184b when housing 102 is in the closed position. In FIG. 1, first and second antenna sub-arrays 182b, 183b are not aligned and thus do not form second antenna array 184b (FIG. 3C). In the open position of housing 102, controller 101 separately manages first antenna sub-array 182b and second antenna sub-array 183b in a second mode. The second mode is using different excitation matrices 170 for independent operation. In a particular embodiment, controller 101 executes antenna mode application 147 that configures modem(s) 119 with respective excitation matrices 170 having magnitudes and phases that are applied to each mmWave antenna 180 of the first and second antenna sub-arrays 182a, 183a to operate independently in mode 2. Modes of first and second sub-arrays 182b, 183b are thus reversed to modes of first and second sub-arrays 182a, 183a as illustrated in more detail in FIGS. 3A-3D.

Figure 3A:
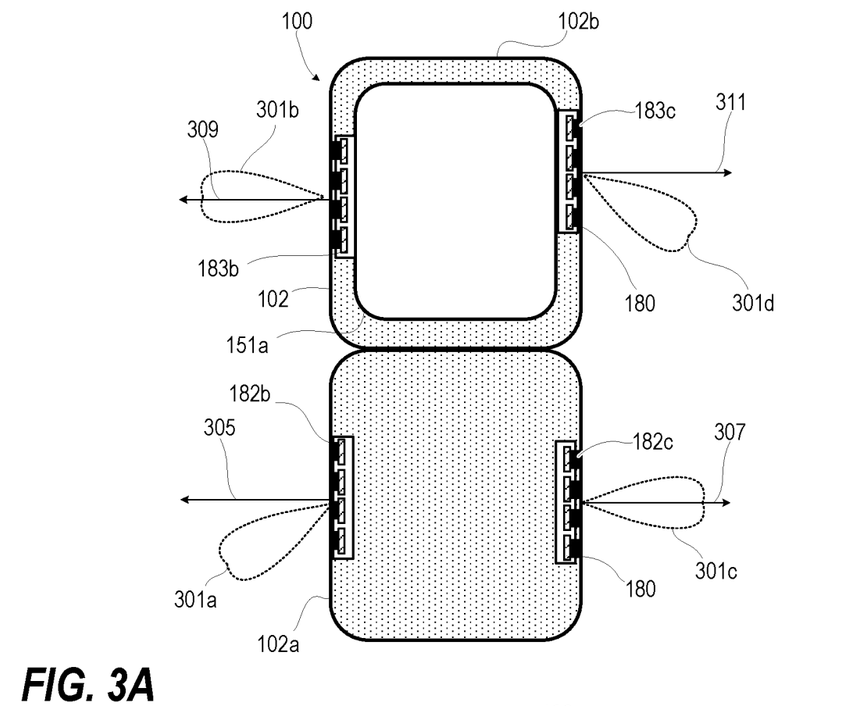
FIG. 3A depicts a back view of a three-dimensional structural example of the communication device of FIG. 1 with a housing having a flip phone form factor in an open position and an antenna subsystem in the second mode, according to one or more embodiments.

FIG. 3A depicts a back view of example communication device 100 with base housing 102a and movable housing 102b of housing 102 in the open position. Movable housing 102b includes back display 151a that constrains placement of second antenna sub-array 183b on the left side as depicted and constrains placement of second antenna sub-array 183c on a right side as depicted. First antenna sub-arrays 182b-182c are respectively placed on left and right sides of base housing 102a. First and second antenna sub-arrays 182c, 183c are an additional pair of antenna sub-arrays that are not depicted in FIG. 1. First antenna sub-array 182b is physically directed along axis 305 that is perpendicular to the left side of base housing 102a. First antenna sub-array 182c is physically directed along axis 307 opposite to axis 305 and that is perpendicular to the right side of base housing 102a. Second antenna sub-array 183b is physically directed along axis 309 that is perpendicular to the left side of mobile housing 102b and parallel to axis 305. Second antenna sub-array 183c is physically directed along axis 311 opposite to and vertically offset from axis 309 and that is perpendicular to the right side of mobile housing 102b and parallel to axis 307. Controller 101 (FIG. 1) independently operates all four of first antenna sub-arrays 182b-182c and second antenna sub-arrays 182b-183c in mode 2. Having four mmWave antennas 180 with appropriate magnitude and phases, first antenna sub-array 182b radiates transmit signal 301a steered partially to the left and partially downward. Second antenna sub-array 183b radiates transmit signal 301b to the left as depicted. First antenna sub-array 182c radiates transmit signal 301c to the right as depicted. Second antenna sub-array 183c radiates transmit signal 301d steered partially to the right and partially downward. For clarity, a simple arrangement is depicted of two pairs of 1×4 sub-arrays that can align with another 1×4 sub-array. Sub-arrays of different numbers of arrangements of mmWave antennas 180 can be chosen and positioned to move apart and to align on different parts of a communication device 100 for particular coverage and antenna performance requirements.

Figure 3B:
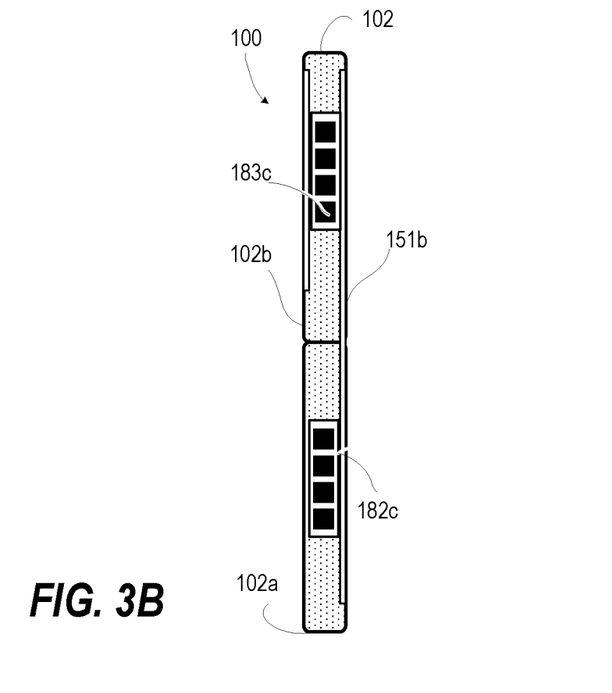
FIG. 3B depicts a right-side view of the example communication device of FIG. 3A with the housing in the open position, according to one or more embodiments.
Figure 3C:
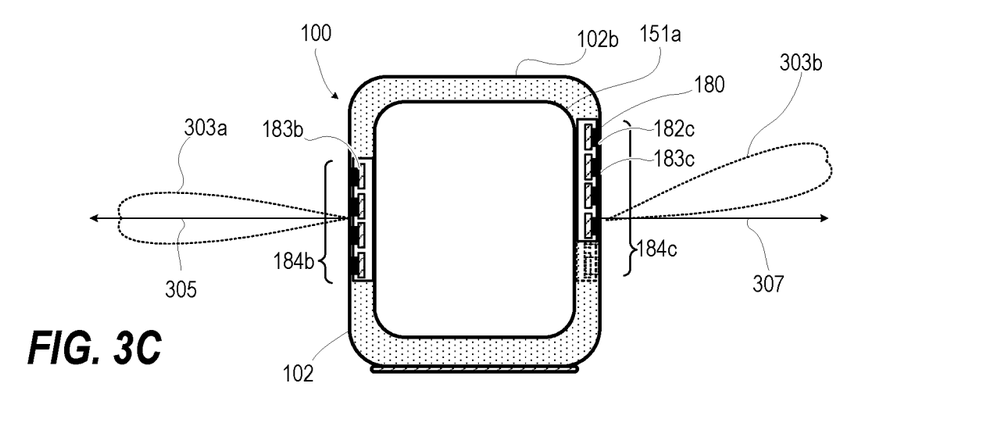
FIG. 3C depicts a back-side view of the example communication device of FIG. 3A with the housing in a closed position and the antenna subsystem in the first mode, according to one or more embodiments.

FIG. 3B depicts a right-side view of example communication device 100 with first and second antenna sub-arrays 182c, 183c on portions of housing 102 that move apart in the open position. First and second antenna sub-arrays 182c, 183c are not aligned in an array in the open position. First and second antenna sub-arrays 182c, 183c are laterally separated. Thus, in the open position, first and second antenna sub-arrays 182c, 183c are operated independently in the second mode.

FIG. 3C depicts a back view of example communication device 100 in a closed position. First antenna sub-array 182b (FIG. 3A) is aligned with second antenna sub-array 183b, forming second antenna array 184b. First antenna sub-array 182c (FIG. 3A) is aligned with but offset from with second antenna sub-array 183c, forming third antenna array 184c.

Figure 3D:
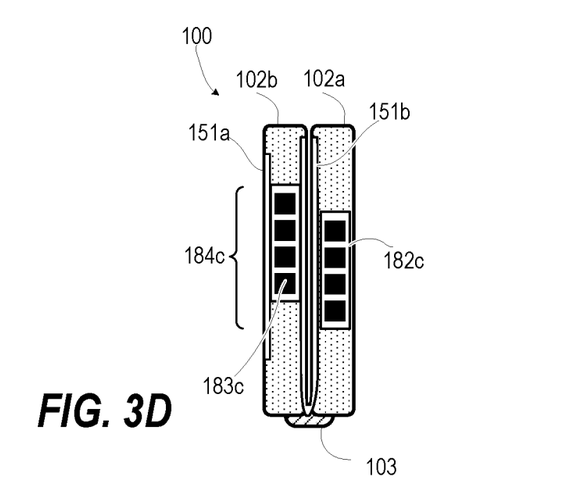
FIG. 3D depicts right side view of the example communication device of FIG. 3A with the housing in the closed position, according to one or more embodiments.

FIG. 3D is a right-side view of example communication device 100 in the closed position. Third antenna array 184c provides an offset array that can be configured with excitation matrix 170 (FIG. 1).

Figure 3E:
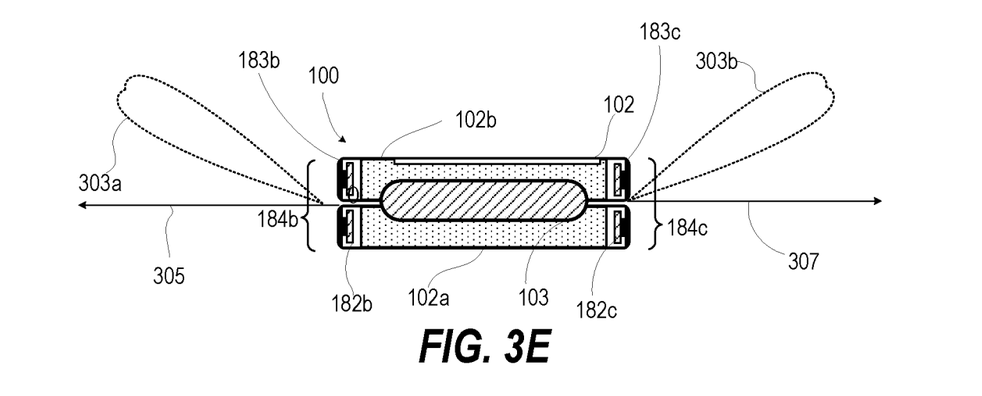
FIG. 3E depicts a bottom view of a pivotable coupling mechanism of the housing of the example communication device of FIG. 3A in the closed position, according to one or more embodiments.

FIG. 3E is a bottom view of pivotal coupling mechanism 103 of example communication device 100. With reference to both FIGS. 3C and 3E, the two-dimensional beam steering can be identified. Second antenna array 184b radiates transmit signal 303a that is directed partially to the left and partially to toward the back. Third antenna array 184c radiates transmit signal 303b that is directed partially to the right, partially upward, and partially toward the back.

In one or more embodiments, a communication device has a movable housing that is received by a base housing for reciprocating translation rather than pivoting. The movable housing can be nested or be coupled underneath as a sliding tray. In one or more embodiments, the communication device can include a base housing that contains a primary communication device. A movable housing contains an accessory communication device that is detachable and attachable to the base housing. Although the mechanical coupling is different between moving into and out of alignment as an array, controller 101 can associate one of the open and the closed positions with alternate ones of the first and second modes. Excitation matrices 170 can be applied for the first and second modes for these alternative housing coupling mechanisms as described above for FIGS. 1, 2A-2D, and 3A-3E.

Figure 4:
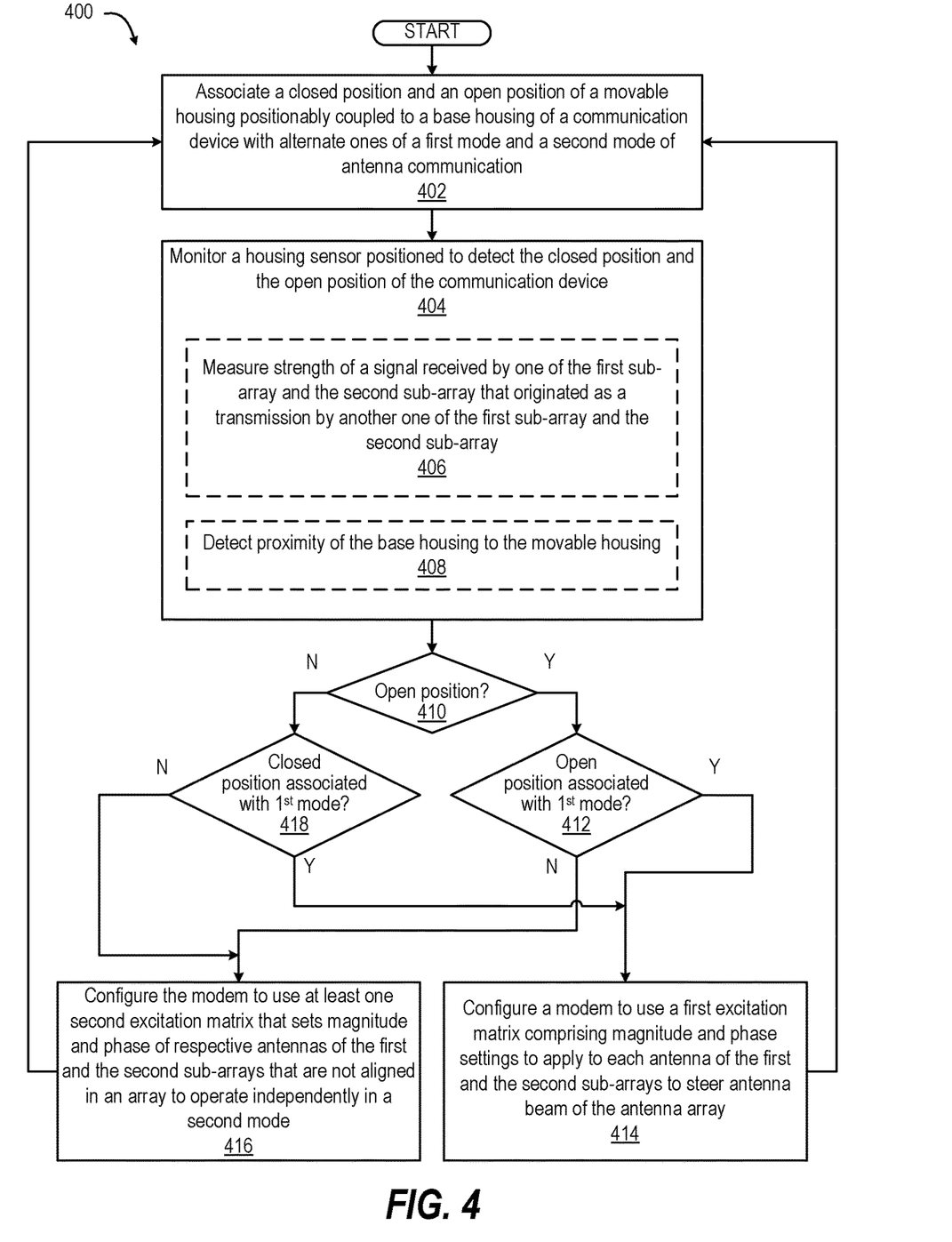
FIG. 4 presents a flow diagram of a method for configuring an antenna sub-array for performing independently or as an array, based on open or closed position of a housing of a communication device, according to one or more embodiments.

FIG. 4 presents a flow diagram of method 400 for configuring antenna sub-arrays for performing independently or as an array based on open or closed position of a housing of a communication device. The description of method 400 is provided with general reference to the specific components illustrated within the preceding FIGS. 1, 2A-2D and 3A-3E. In at least one embodiment, method 400 can be performed using antenna subsystem 108 of communication device 100, managed by controller 101 (FIG. 1). Specific component described in method 400 can be identical or similar to specific components of the same name used to describe preceding FIGS. 1, 2A-2D and 3A-3E.

With reference to FIG. 4, method 400 includes associating a closed position and an open position of a movable housing positionably coupled to a base housing of a communication device with alternate ones of a first mode and a second mode of antenna communication (block 402). Method 400 includes monitoring a housing sensor positioned to detect the closed position and the open position of the communication device (block 404). In one or more embodiments, method 400 includes monitoring the housing sensor by measuring strength of a signal received by one of the first sub-array and the second sub-array. The signal originates as a transmission by another one of the first sub-array and the second sub-array (block 406). In one or more embodiments, method 400 includes monitoring the housing sensor by detecting proximity using a proximity sensor of the base housing to the movable housing (block 408).

A determination is made, in decision block 410, whether the housing is in the open position based on the housing sensor. In response to determining that the housing is in the open position, a determination is made, in decision block 412, whether the open position is associated with the first mode. In response to determining that the open position is associated with the first mode, method 400 includes the controller configuring a modem to use a first excitation matrix to apply to each antenna of the first and the second sub-arrays in order to steer antenna beam of the antenna array (block 414). The first excitation matrix comprises magnitude and phase settings. Then method 400 returns to block 402. In one or more embodiments, the first mode utilizes an antenna array that includes a first sub-array of at least one first antenna housed within to the base housing and aligned with a second sub-array of at least one second antenna housed within to the movable housing. The magnitude and phase provided by the excitation matrix for each antenna is selected based on the relative positions of each antenna in the array to create the antenna beam steering and antenna gain. In one or more embodiments, each antenna of the first and the second sub-arrays is a planar antenna that operates in a millimeter wave (mmWave) frequency band. In response to determining that the open position is not associated with the first mode, method 400 includes configuring the modem to use at least one second excitation matrix for the first and the second sub-array that are not aligned in an array. The at least one second excitation matrix sets respective magnitude and phase of respective antennas of the first and the second sub-arrays to operate independently in a second mode (block 416). Then method 400 returns to block 402. In response to determining that the housing is not in the open position, a determination is made, in decision block 418, whether the closed position is associated with the first mode. In response to determining that the closed position is associated with the first mode, method 400 returns to block 414. In response to determining that the closed position is not associated with the first mode, method 400 returns to block 416.

In one or more embodiments, the closed position is associated with operating one pair of first and second antenna sub-arrays as a combined antenna array in the first mode. The open position is associated with operating the one pair of first and second antenna sub-arrays as separate antennas in the second mode. In one or more embodiments, the open position is associated with operating another pair of first and second antenna sub-arrays as a combined antenna array in the first mode. The closed position is associated with operating the other pair of first and second antenna sub-arrays as separate antennas in the second mode. In one or more embodiments, both pairs of first and second antenna sub-arrays are incorporated in the same communication device. Mode 1 and mode 2 are used on different pairs of the first and the second antenna sub-arrays in the open position and the closed position of the housing of the communication device, such that one pair of antenna sub-arrays operates as a combined antenna array in mode 1 and at least one other pair of antenna sub-arrays operates as individual antennas in mode two.

In the above described flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
   a base housing;
   a movable housing positionably coupled to the base housing and movable between a closed position and an open position; and
   a housing sensor positioned to detect the closed position and the open position of the movable housing, each of the closed position and open position being associated with alternate ones of a first mode of antenna communication and a second mode of antenna communication;
   a first sub-array of at least one first antenna housed within the base housing;
   a second sub-array of at least one second antenna housed within the movable housing and positioned in one of the open and the closed positions to be aligned with the first sub-array to form an antenna array and to be unaligned with the first-sub-array when positioned in another one of the open and the closed positions;
   wherein the second sub-array is positioned to be aligned with the first sub-array to form the antenna array when the movable housing is in the open position and to be unaligned with the first-sub-array when the movable housing is in the closed position;
   a modem communicatively coupled to each antenna of the at least one first antenna and the at least one second antenna to communicate with a node via the at least one first antenna and the at least one second antenna; and
   a controller communicatively coupled to the housing sensor and the modem, and which:
      monitors the housing sensor to identify an open/closed position of the movable housing;
      in response to the open/closed position of the movable housing being associated with a first mode of communication, configure the modem to use the first antenna and the second antenna; and
      in response to the open/closed position of the movable housing being associated with a second mode of communication, configure the modem to operate the first antenna and the at least one second antenna independently.

2. The communication device of claim 1, wherein each of the at least one first antenna and the at least one second antenna comprises a planar antenna that operates in a millimeter wave (mmWave) frequency band.

3. The communication device of claim 1, wherein the housing sensor comprises a transmission feedback receiver that measures strength of a signal received by one of the first sub-array and the second sub-array that originated as a transmission by another one of the first sub-array and the second sub-array.

4. The communication device of claim 1, wherein the housing sensor comprises a proximity sensor mounted to one of the base housing and the movable housing and a target mounted to another one of the base and the movable housing.

5. The method of claim 1, further comprising associating the closed position with the first mode and the open position with the second mode.

6. The communication device of claim 1, further comprising a memory comprising: (i) a first excitation matrix associated with the first mode of communication, the first excitation matrix comprising magnitude and phase settings to apply to each antenna of the at least one first antenna and the at least one second antenna to steer antenna gain of the antenna array; and (ii) at least one second excitation matrix associated with the second mode of antenna communication and which sets magnitude and phase of respective antennas of the at least one first antenna and the at least one second antenna to operate independently.

7. A method comprising:
   associating a closed position and an open position of a movable housing positionably coupled to a base housing of a communication device with alternate ones of a first mode of antenna communication and a second mode of antenna communication, the first mode utilizing an antenna array of a first sub-array of at least one first antenna housed within the base housing aligned with a second sub-array of at least one second antenna housed within the movable housing, the second mode independently utilizing the first sub-array and the second sub-array that are not aligned;
   monitoring a housing sensor positioned to detect the closed position and the open position, wherein the second sub-array is positioned to be aligned with the first sub-array to form the antenna array when the movable housing is in the open position and to be unaligned with the first-sub-array when the movable housing is in the closed position;
   in response to identifying the open/closed position that is associated with the first mode, configuring a modem to use each antenna of the first and the second sub-arrays to steer antenna gain of the antenna array; and
   in response to identifying the open/closed position that is associated with the second mode, configuring the modem to operate the first and the second sub-arrays to operate independently.

8. The method of claim 7, further comprising associating the open position with the first mode and the closed position with the second mode.

9. The method of claim 7, wherein each antenna of the first and the second sub-arrays comprises a planar antenna that operates in a millimeter wave (mmWave) frequency band.

10. The method of claim 7, further comprising measuring strength of a signal received by one of the first sub-array and the second sub-array that originated as a transmission by another one of the first sub-array and the second sub-array.

11. The method of claim 7, further comprising detecting, via the housing sensor, proximity of the base housing to the movable housing.

12. A computer program product comprising:
   a computer readable storage device; and
   program code on the computer readable storage device that when executed by a processor associated with a communication device, the program code enables the communication device to provide the functionality of:
      associating a closed position and an open position of a movable housing positionably coupled to a base housing of the communication device with alternate ones of a first mode of antenna communication and a second mode of antenna communication, the first mode utilizing an antenna array of a first sub-array of at least one first antenna housed within the base housing aligned with a second sub-array of at least one second antenna housed within the movable housing, the second mode independently utilizing the first sub-array and the second sub-array that are not aligned;

monitoring a housing sensor positioned to detect the closed position and the open position, wherein the second sub-array is positioned to be aligned with the first sub-array to form the antenna array when the movable housing is in the open position and to be unaligned with the first-sub-array when the movable housing is in the closed position;

in response to identifying the open/closed position that is associated with the first mode, configuring a modem to use each antenna of the first and the second sub-arrays to steer antenna beam of the antenna array; and in response to identifying the open/closed position that is associated with the second mode, configuring the modem to operate the first and the second sub-arrays to operate independently.

13. The computer program product of claim 12, wherein the program code enables the communication device to provide the functionality of associating the closed position with the first mode and the open position with the second mode.

14. The computer program product of claim 12, wherein the program code enables the communication device to provide the functionality of associating the open position with the first mode and the closed position with the second mode.

15. The computer program product of claim 12, wherein each antenna of the first and the second sub-arrays comprises a planar antenna that operates in a millimeter wave (mmWave) frequency band.

16. The computer program product of claim 12, wherein the program code enables the communication device to provide the functionality of measuring strength of a signal received by one of the first sub-array and the second sub-array that originated as a transmission by another one of the first sub-array and the second sub-array.

17. The computer program product of claim 12, wherein the program code enables the communication device to provide the functionality of detecting, via the housing sensor, proximity of the base housing to the movable housing.

* * * * *